Figure 3:
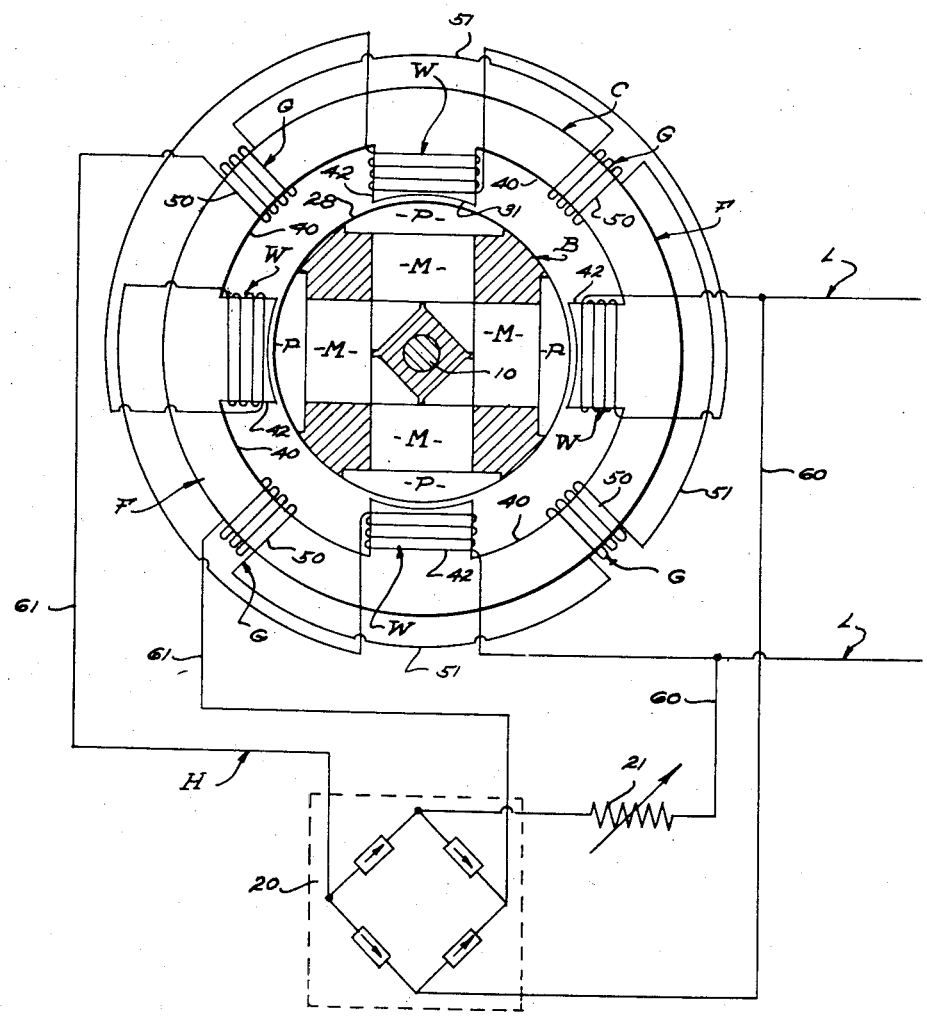

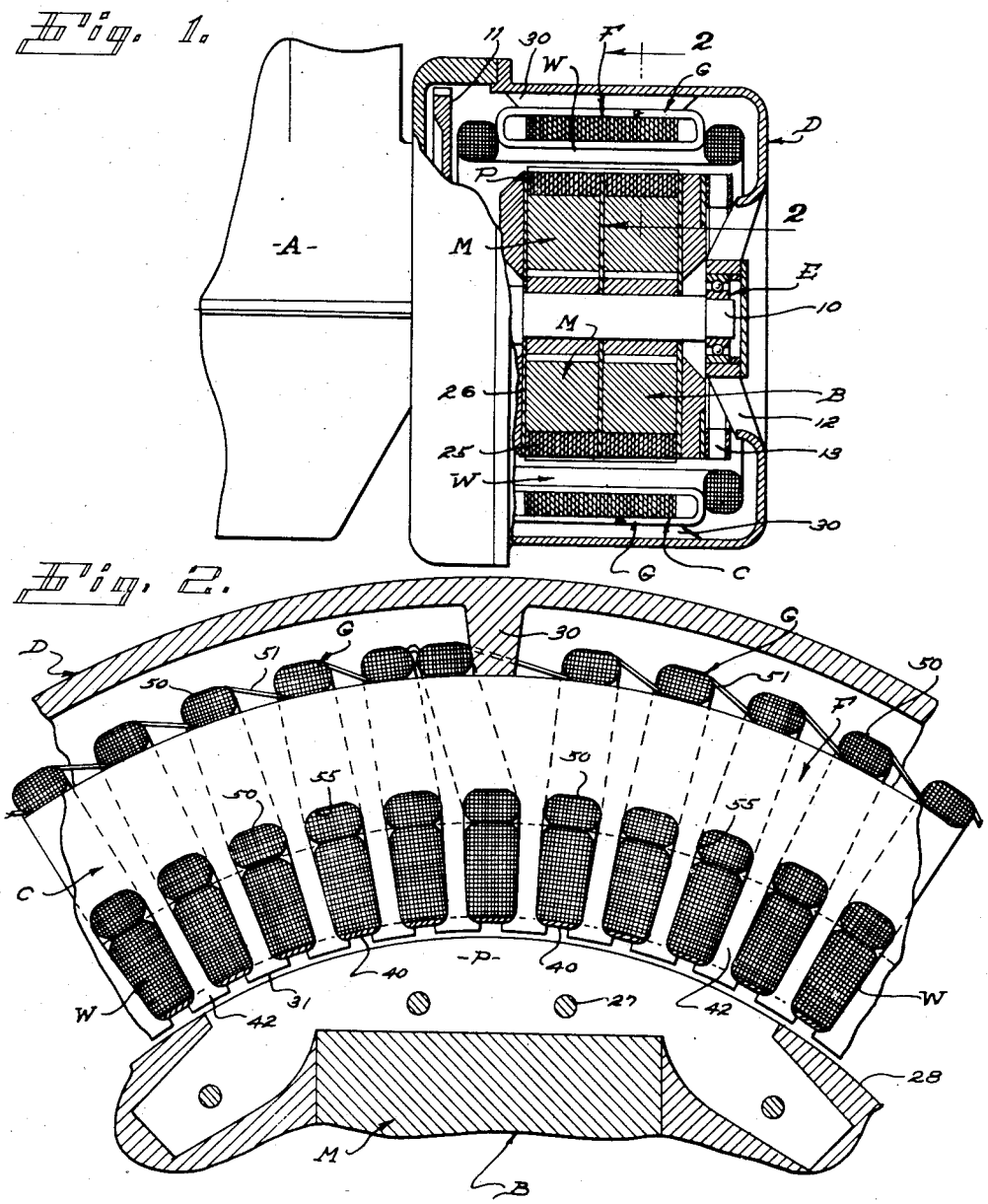

Aug. 14, 1951     M. W. BRAINARD     2,564,320
PERMANENT MAGNET TYPE ELECTRIC GENERATOR
Filed Dec. 17, 1948     2 Sheets-Sheet 2

Inventor
Maurice W. Brainard
By
Attorney

Patented Aug. 14, 1951

2,564,320

UNITED STATES PATENT OFFICE 2,564,320

PERMANENT MAGNET TYPE ELECTRIC GENERATOR

Maurice W. Brainard, Los Angeles, Calif., assignor of one-half to O'Keefe and Merritt Company, a corporation of California Application December 17, 1948, Serial No. 65,918

2 Claims. (Cl. 322—28)

This invention relates to a permanent magnet type electric generator, and it is a general object of the invention to provide a practical, effective generator of this type in which the voltage output may be regulated to suit the load conditions.

In recent years materials have been developed for the making of magnets so that permanent magnet type generators are commercially practical, or can be made reasonably uniform and on a practical, efficient basis. An undesirable characteristic of the ordinary generator of this general type is that the voltage varies widely, being very high when the generator is under light load and dropping seriously when the generator is loaded appreciably. This defect has been recognized and it is common to attempt correction by a transformer-like structure commonly referred to as a compensator, but in practice this has not proved altogether satisfactory or commercially practical.

It is a general object of this invention to provide a generator of the permanent magnet type so constructed that it may be operated to maintain the desired voltage under various load conditions. With the generator of the present invention, as the load on the generator varies in such manner as to affect voltage, correction may be made accurately and while the generator is in use, so that the desired voltage is maintained under any particular load condition.

Another object of this invention is to provide a generator of the general character referred to in which there are two relatively moving elements, one a rotor and the other a stator, one of the elements being characterized by permanent magnets delivering magnetic flux to poles adjacent the other element, and the other element is characterized by windings that cut the magnetic flux while a magnetized member regulates the magnetic flux.

It is an object of the invention to provide a generator of the general character referred to in which the magnetized member that regulates the magnetic flux carries the windings which cut the magnetic flux, to the end that the structure is simple, compact and practical.

It is another object of the invention to provide a generator of the general character referred to in which the magnetized member that controls the magnetic flux from the permanently magnetized element is magnetized by means of a winding energized from the current generated through cooperation of the two elements.

A further object of the invention is to provide a generator of the character referred to wherein the circuit to the winding magnetizing the member controlling the magnetic flux includes a variable control such as a rheostat, so that the magnetic saturation of the control member may be independently varied.

Another object of the invention is to provide a generator of the general character referred to in which the circuit for the winding magnetizing the control member receives alternating current from cooperative action of the rotor and stator and includes a rectifier that delivers direct current to the said winding.

The various objects and features of my invention will be fully understood from the following detailed description of a typical preferred form and application of the invention, throughout which description reference is made to the accompanying drawings, in which:

Fig. 1 is a view of a generator embodying the present invention showing it on or coupled to a prime mover and showing parts broken away to appear in section to illustrate the general arrangement and relationship thereof. Fig. 2 is an enlarged detailed view of a portion of the generator taken as indicated by line 2—2 on Fig. 1, and Fig. 3 is a diagrammatic view illustrating the circuit provided in carrying out the present invention.

The generator of the present invention may be varied widely in form, size and capacity and in any particular case various details such as I will describe may be varied to suit the conditions to be met. In the drawings I have illustrated an alternating current generator designed to be driven by a prime mover such as an internal combustion engine A, and I have shown the generator directly coupled to the engine A so that the shaft 10 of the generator is directly coupled with that of the engine or may even be a mere extension thereof.

The present invention provides, generally, two relatively moving parts, one a stator and the other a rotor, and, in accordance with the broader principles of the invention, features that I will describe as applied to the rotor may be incorporated in the stator instead of the rotor, and features which I will describe as incorporated in the stator may be incorporated in the rotor instead of the stator.

In the particular case illustrated the generator involves a rotor or field element B mounted directly on the shaft 10, and a stator or armature element C surrounding the rotor with suitable working clearance characteristic of electric machines of this type. The generator may also include features such as a suitable case D, bearings E supporting the shaft 10 in or from the case, or other suitable parts. Further, in the case illustrated the structure is shown as including an element 11 located in the case D and acting as a flywheel. It is also to be understood that the case D may be suitably ventilated and the entire structure may include features of construction and arrangement of parts advantageous in machines of this character. In the case illustrated the case D is shown with air inlet openings 12 and air circulating elements 13 are provided on the rotor to establish a desired circulation of air within the case.

In a broad sense my invention provides permanent magnets M so mounted and arranged as to produce magnetic flux at pole pieces P circumferentially spaced at the periphery of the element of the structure carrying the magnets. The invention also provides bundles of wires or windings W at the other element and preferably supported close to the pole pieces in such manner as to cut the magnetic fields or the magnetic flux from the poles. The structure also includes what I will refer to as a control member F which carries or conducts magnetic flux from the poles P and it provides one or more windings G related to the control member F so that when energized the member F is magnetized or becomes partially saturated with magnetic flux, to the end that the magnetic reluctance thereof is varied.

The invention provides a circuit H as shown in the diagram, Fig. 3, by which the winding or windings G are energized and where the circuit H is energized from cooperative action of the two relatively moving elements of the generator so that alternating current is fed into the circuit, a suitable rectifier 20 is included in the circuit. Further, the invention provides control or regulating means 21 in the circuit H which may, in practice, be in the form of a variable resistance as indicated in diagram, Fig. 3.

In the particular form of the invention illustrated the magnets M and poles P are confined to one element of the generator, namely, the rotor B, while the windings W are a part of the other element of stator and the control member F with its winding or windings G is combined with the windings W to form therewith a part of the stator C.

In the particular form of rotor illustrated in the drawings the poles P are made up of laminations 25 held by radially disposed plates 26 mounted on the shaft 10. The magnets M in this case are carried within the laminations 25 of the poles P and between the plates 26, and the whole structure is held assembled into a rigid unit by suitable axially disposed tie bars 27. It is to be understood, of course, that the periphery 28 of the rotor is smooth and turned concentric with the shaft 10 on which the rotor is fixed. It is also to be understood that the magnets M and pole pieces P are so related and disposed that the pole pieces are circumferentially spaced around the rotor at the periphery thereof and the magnets are so related to the pole pieces as to establish the desired polarity at the pole pieces.

The preferred form of the invention as illustrated in the drawings employs the control member F to serve not only as a control for the magnetic flux delivered or set up by the rotor, but also as a mounting or carrier for the windings W and the winding or windings G and thus the member F becomes a principal part of the stator C. In the particular structural arrangement illustrated the member F is an annular member surrounding the rotor B and is supported concentric with the rotor by ribs 30 projecting inwardly from the case and engaging the outer periphery of the member F. The member F is so supported through the structure just described that its inner periphery 31 is spaced from the periphery 28 of the rotor so that there is working clearance between these parts.

The member F may vary widely in form, size, proportioning and construction. In the case illustrated the member F is of simple form and construction and is a laminated unit or element in which the several laminations extend continuously around the member F and are engaged one against the other, in which position they are held or fixed by suitable securing or fastening means common to structures of this general character.

The windings W are groups or bundles of wires that are provided to cut through or break the magnetic field or flux from poles P, and in practice they may vary widely in form, arrangement and relationship. I have shown an arrangement suitable for an alternating current generator and it is to be understood that the several windings my be suitably lapped or interrelated so that they, in effect, form an annular body of windings surrounding the rotor. Where the windings W are supported by the control member it is desirable to provide the member F with circumferentially spaced recesses 40 extending into the member F from its inner periphery 31. In the case illustrated there are many recesses 40 equally spaced around the member F and the recesses extend radially outward from the periphery 31 and, therefore, into the member F so that they are deep enough to adequately accommodate the windings W.

Through the provision of the numerous recesses 40, as just described, the member F is, in effect, provided with a plurality of circumferentially spaced inwardly projecting parts or teeth 42, which occur between the recesses and the innermost ends of the parts 42, in effect, form poles which oppose and are close to the outer periphery 28 of the rotor to effectively receive the magnetic flux therefrom. It is to be understood that the several windings W or the annular unitary winding W of the stator, however this element of the structure is considered, may be provided with leads L by which the current generated is conducted from the machine.

With the mechanism thus far described magnetic flux from the poles P of the rotor is readily picked up and communicated by the member F, the member F being formed of a magnetic material. It will be understood that as the rotor operates or revolves a rotating field is produced, the lines of flux linking the stator being cut by the windings W.

My present invention contemplates establishing a field in the member F other and different from that set up by the magnets of the rotor, and in accordance with my invention I effectively vary the action of the generator as to its voltage output by so saturating the member F with flux other than that derived from the rotor as to vary the magnetic reluctance of the stator flux path.

In the form of the invention illustrated the winding or windings G related to the control member F are so related to the member F as to produce flux in member F upon their being energized. In the case illustrated a plurality of individual windings or units 50 of windings are related to the control member F and are circumferentially spaced around the member F, and these winding units 50 are subject to being uniformly energized so that the member F is uniformly charged magnetically. The units 50 may be considered as individual windings and as shown in Fig. 2, they are spaced apart circumferentially, in which case adjacent windings may be coupled or connected by suitable connectors 51 so that the entire body of windings 50 are connected in series to be energized by the circuit H.

In the preferred form of the invention the winding units 50 surround the member F, and in the case illustrated I have shown a unit or winding 50 surrounding the member F at each of the several notches 40, the notches being deepened at 55 to receive the windings. With this arrangement and relationship of parts just described it will be observed that the axes of the windings 50 are disposed circumferentially of member F while the axes of individual windings W, which may be carried in the same notches 40, are, in effect, disposed radially of the member F.

The circuit H is provided primarily for energizing the winding or windings G on the control member F, and for the desired action it supplies direct current to the windings G in such quantity as to effect the desired magnetic saturation of member F. It will be apparent that the circuit H, for the purpose of providing voltage adjustment may be energized from any suitable source or, as shown in the drawings, it may be energized from the generator itself by being connected with the leads L through suitable connections 60.

The generator being an alternating current generator, the current handled by the lines 60 is alternating current and unsuitable for energization of the windings G, and therefore, the circuit H includes the rectifier 20. The lines 60 are shown extending to the rectifier and the particular rectifier indicated in the drawings is of the dry type or solid disc type. It is to be understood, of course, that in practice any suitable rectifier may be used, as circumstances may require. Suitable connections or lines 61 receive direct current from the rectifier and are suitably connected to the windings G so that the proper degree of saturation is produced in the member F.

To gain a desired voltage, for instance to establish a desired voltage for a particular load, the current supplied to the windings G is varied or regulated until the desired balance is obtained. To gain the desired regulation of the current supplied to the windings G a regulator, such as a rheostat or variable resistance 21, is included in the circuit H and, in practice, such element may be conveniently located and may be such that it may be readily adjusted manually.

From the foregoing description it will be apparent that as the generator operates, that is, as the rotor turns within the stator, the magnetic flux produced by the fixed magnets M is picked up and communicated through the member F, but only to the extent that the member F has capacity to handle such magnetic flux. By my present invention I, in effect, superimpose a magnetic flux in the machine or in the member F, or I partially saturate the member F magnetically, and thereby vary the reluctance of that member. The amount of armature linking flux produced by magnets M, and the amount of flux effective or available for the generation of current, by the present invention is dependent upon the output voltage through a voltage responsive circuit.

It will be apparent that by varying the flux produced in the member F by the windings G I am able to effectively vary the reluctance of member F and, consequently, I am able to regulate the generator so that at any particular time, or under any particular load condition, the desired voltage output is obtained.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. An electric generator comprising: a shaft; a rotor carried thereon having circumferentially spaced laminated poles and permanent magnets producing flux at said poles; a stator surrounding the rotor including a laminated annular member provided with deep, circumferentially spaced recesses concentric with the rotor extending into said annular member from the inner periphery thereof; a casing having spaced inwardly extending ribs engaging said annular member providing spaces outward of said annular member, and bearings supporting the shaft and the rotor; armature windings carried by said member in said recesses wound with their axes radially disposed thereof; series connected stator saturating windings carried by said annular member with their axes circumferentially disposed therof, wound in said recesses and in said spaces outward of said annular member; an energizing circuit for said stator saturating windings including a rectifier excited from across the output of said generator and a variable rheostat connected in said circuit to adjust the saturating current whereby direct current is supplied to said series connected stator saturating windings for regulating the reluctance of said annular member.

2. An electric generator comprising: a shaft; a rotor carried thereon including plates axially disposed and mounted on said shaft, circumferentially spaced poles made up of laminations carried between said plates, permanent magnets producing magnetic flux at said poles carried within said laminations and between said plates, and axially extending tie bars holding said plates, said poles and said permanent magnets in assembly; a stator surrounding the rotor including a laminated annular member provided with deep, circumferentially spaced recesses concentric with the rotor extending into said annular member from the inner periphery thereof; a casing having spaced inwardly extending ribs engaging said annular member providing spaces outward of said annular member, and bearings supporting the shaft and the rotor; armature windings carried by said member in said recesses wound with their axes radially disposed thereof; series connected stator saturating windings carried by said annular member with their axes circumferentially disposed thereof, wound in said recesses and in said spaces outward of said annular member; an energizing circuit for said stator saturating windings including a rectifier excited from across the output of said generator and a variable rheostat connected in said circuit to adjust the saturating current whereby direct current is supplied to said series connected stator saturating windings for regulating the reluctance of said annular member.

MAURICE W. BRAINARD.

(References on following page)

REFERENCES CITED

The following references are of record in the file of this patent:

UNITED STATES PATENTS

| Number | Name | Date |
|---|---|---|
| 1,685,970 | Townsend et al. | Oct. 2, 1928 |
| 1,736,618 | Nickle | Nov. 19, 1929 |
| 1,843,250 | Spencer | Feb. 2, 1932 |
| 1,961,185 | Witzel | June 5, 1934 |
| 2,218,859 | Schweitzer, Jr. | Oct. 22, 1940 |
| 2,313,931 | Geiselman | Mar. 16, 1943 |
| 2,407,883 | Jackson | Sept. 17, 1946 |
| 2,469,662 | Minchin | May 10, 1949 |
| 2,486,435 | Rex | Nov. 1, 1949 |

FOREIGN PATENTS

| Number | Country | Date |
|---|---|---|
| 591,892 | Germany | Feb. 20, 1932 |